United States Patent Office 2,919,540
Patented Jan. 5, 1960

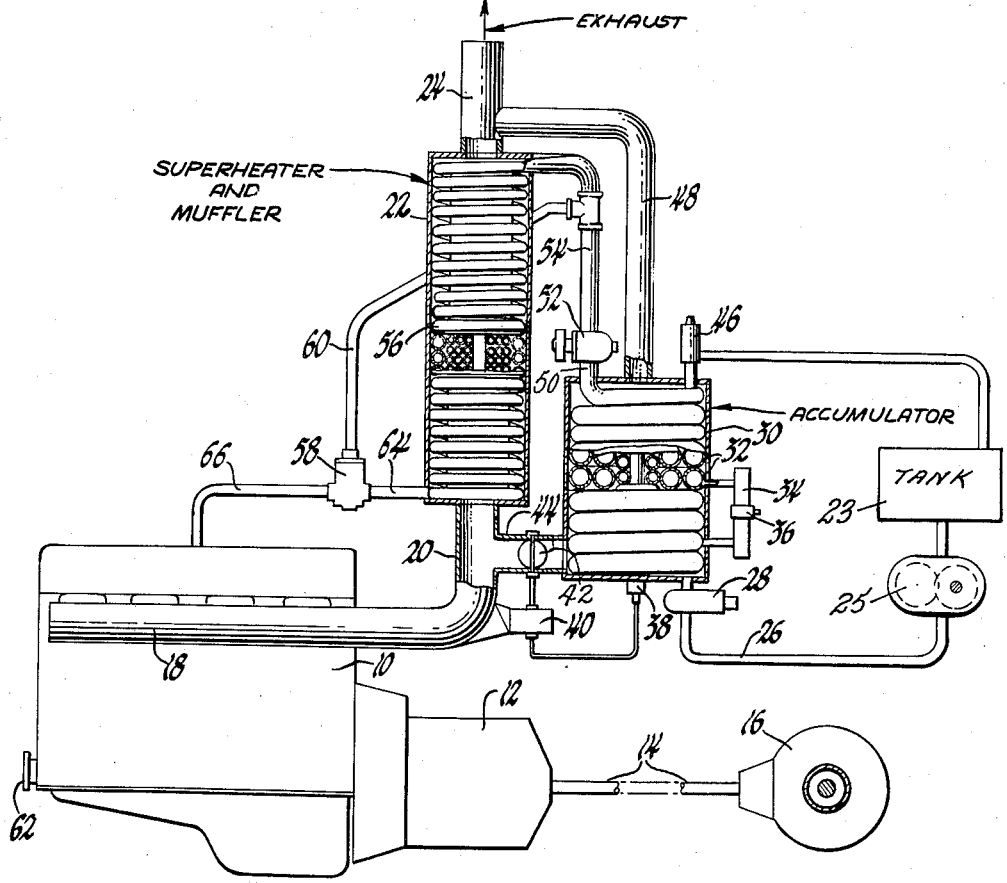

2,919,540

MECHANISM FOR UTILIZING WASTE HEAT

Worth H. Percival, Birmingham, Mich., assignor to General Motors Corporation, Detroit, Mich., a corporation of Delaware Application February 25, 1957, Serial No. 642,185

2 Claims. (Cl. 60—11)

This invention relates to a waste heat accumulating mechanism and more particularly to such a mechanism as a source of energy for increasing the power available to internal combustion engines during short periods of operation. The accumulating mechanism preferably uses the waste heat available in the engine exhaust and stores it until needed.

Previous proposals have been made to use the waste heat discharged in the exhaust gases of internal combustion engines including the use of steam to drive a steam engine in combination with internal combustion engine. While these proposals have had a limited success, they have been restricted in their application since they applied the excess power obtained to the load on the system at all times. A relatively small amount of constantly applied power was, therefore, realized. The power normally generated by the internal combustion engine and available without the use of the exhaust heat salvaging system is usually sufficient to meet the requirements demanded by the engine operator, so the small additional supply of power was not economically feasible.

In order to obtain the greatest efficiency from the waste heat system it is now proposed that a system be used in combination with an internal combustion engine which will deliver a maximum amount of power over a relatively short period of time when that power is needed. The heat accumulator system would store up the energy expended through the exhaust system during the times when the extra power is not desired.

In the drawing, the figure shows an internal combustion engine with a power delivery system and a waste heat accumulator system which utilizes the waste heat in the engine exhaust and delivers usable power to the engine load at desirable intervals.

A conventional internal combustion engine 10, which may be of either the gasoline or diesel type, is provided with a transmission 12 having a drive shaft 14 extending therefrom and connecting a differential 16 such as may be used in an automotive vehicle. The exhaust manifold 18 of the internal combustion engine is connected to an exhaust pipe 20 leading to a superheater and muffler 22. The exhaust gases pass through the superheater and muffler and are discharged to the atmosphere through a tail pipe 24. The superheater and muffler 22 forms a portion of the energy intake section of the waste heat accumulating system.

A storage tank 23 may be provided to hold a reserve supply of water or other suitable fluid for the system. A positive displacement pump 25 which may be driven by any convenient means pumps water from the storage tank through conduit 26 to a water pressure regulator 28. This pressure regulator controls the positive displacement pump 25 by any convenient system and may employ mechanical, electrical, pneumatic or other signaling devices to start and stop the pump. The water is conducted from regulator 28 to an accumulator 30, which preferably consists of a bundle of tubes 32 or a tank having a suitable internal volume. By using tubes there is less danger from rupture of the system and faster heat transfer is realized. A slight gauge 34 may be provided in order that the level of the water in the tubes may be checked visually. A level switch 36 may also be operatively connected with the tubes and may be of any convenient form such as a float inside the sight gauge tube which is attached to a permanent magnet. The magnet may actuate a switch located externally of the tube. This switch turns off the pump 25 for the initial filling of the accumulator to the desired level in a cold condition. After the system is operating normally the level switch is by-passed and the pump 25 is thereafter controlled by the pressure regulator 28. As the pressure in the accumulator falls to a predetermined value, the regulator energizes the pressure pump. As the temperature of the accumulator water decreases, it is detected by a thermostat 38 which signals a suitable motor 40, operating a butterfly valve 42 which is located in a pipe 44 leading from the exhaust pipe 20 at a point intermediate the exhaust manifold 18 and the superheater and muffler 22. The valve 42 admits hot exhaust gases into the accumulator 30. These gases pass around tubes 32 and heat the water contained therein. When either the pressure or the temperature of the water in the accumulator reaches a desired value, the appropriate control is actuated to prevent additional pressure or heat from being impressed on the water in the accumulator. Should the accumulator become overfilled, the safety valve 46 will open at a predetermined pressure and return the excess water and/or steam to the storage tank where it will be retained for later use. Any steam so returned will be condensed in the storage tank. The exhaust gases passing through the accumulator are returned to the primary exhaust system of the engine through the pipe 48 which connects with tail pipe 24.

The tubes 32 within the accumulator discharge the heated and pressurized water into a conduit 50 in which a reducing valve 52 is located. This valve may be actuated in any suitable manner when a temporary increase in delivered power is desired. It may be connected with other control elements to be actuated automatically under a given condition or may be manually controlled by the operator. When the reducing valve 52 is open, the pressure in the accumulator drops, with the result that some of the hot water contained therein flashes into steam. The heat of vaporization is derived from the drop in internal energy of the water within the accumulator in addition to the heat stored in the tubes 32. The steam obtained passes through conduit 54 into the superheater 22 which is preferably comprised of a bundle of tubes 56 within a special muffler. The temperature of the steam discharged from the superheater may be regulated by a thermostatic valve 58 which permits some of the cooler steam to by-pass the superheater through conduit 60 and to mix with the higher temperature steam from the superheater 22. The steam passing through the valve 58 is delivered to an appropriate part of the engine and drive system and expanded to obtain the additional power desired.

An expansion engine such as a turbine may be located in any of several positions. By way of example, it may be located at the front 62 of the internal combustion engine and drive through the engine crankshaft. It may be positioned immediately adjacent or integrally formed with the transmission 12 or the differential 16. Should it not be desired to provide a turbine, which would necessitate the use of reduction gears and an over-running clutch, the steam may be passed directly into the cylinders of the internal combustion engine during or immediately following the combustion part of the cycle. The steam could be admitted by means of a poppet valve for each cylinder and a separate valve actuating mechanism. The exhaust steam may be passed directly to the atmosphere or, should a turbine be used, it may be condensed by the cool storage water. The area of the turbine nozzle would be determined by the particular period of time chosen for a complete cycle in which the accumulator pressure is reduced from the high predetermined value to the inlet pressure at the turbine. The turbine area would vary inversely with the cycle time desired as would the average power available during the cycle. The number of cycles available would be limited by the quantity of water carried, assuming no condensation of the exhaust steam is utilized.

By way of example, the following conditions give a satisfactory result in such a system. The positive displacement pump keeps the pressure within the accumulator at approximately 2800 p.s.i. abs. The desired level of water within the accumulator on the initial filling may be such that, when the water reaches a temperature of approximately 685° F., it will have expanded to fill the entire volume of the accumulator and will be at a pressure of 2800 p.s.i. abs., which corresponds to the pressure of saturated water at that temperature. The safety valve 46 may be set to open at approximately 2900 p.s.i. abs. The steam discharged from the superheater through line 64 may be approximately 900° F. and 400 p.s.i. abs. If the steam from the superheater is over 900° F., valve 58 opens to mix cooler steam from the accumulator to maintain the temperature of the steam in conduit 66 at approximately 900° F. The steam passing through conduit 66 may then be expanded through the turbine or the engine cylinders to approximately 17 p.s.i. abs.

Should a system using these values be used, the power available from the device during different time periods may be readily calculated. For example, using a one cubic foot capacity accumulator and based on a turbine reduction gear efficiency of 70 percent, the approximate brake horsepower obtainable during various cycle times are as follows:

| Time of cycle, seconds: | B.H.P. average |
|---|---|
| 30 | 168 |
| 50 | 100 |
| 60 | 84 |
| 90 | 56 |
| 120 | 42 |

Should a 200 brake horsepower gasoline engine be used, the exhaust heat would be sufficient to charge the accumulator in approximately two minutes. A power boost cycle of 50 seconds would, therefore, increase the overall power available to approximately 300 brake horsepower for that period of time. Should a diesel engine be used, the time between cycles would be extended to about 3½ minutes because of the smaller percentage of waste heat available from that type engine.

A waste heat accumulator and power boost system has thus been disclosed which uses the heat being discharged through the exhaust system of an internal combustion engine to provide additional power as desired by the operator.

I claim:
1. Mechanism for cyclically increasing power delivered by an internal combustion engine by introduction and expansion of steam therein, said steam being generated by heat obtained from the exhaust gases being discharged from said engine, said mechanism comprising engine exhaust gas conduit means, heat exchanging and accumulating means associated therewith for extracting heat energy from exhaust gases passing through said gas conduit means and storing said heat energy in water, heat exchanging and muffling means associated with said exhaust gas conduit means for exhausting heat energy from exhaust gases passing through said exhaust gas conduit means, conduit means connecting said heat exchanging and accumulating means and said heat exchanging and muffling means in series with an internal combustion engine and delivering steam under pressure to said engine during the work strokes thereof to increase the power delivered by said engine, a first control valve in said connecting conduit means for controlling the flow of steam therebetween, bypassing conduit means connected with said connecting conduit means in parallel with said heat exchanging and muffling means for bypassing steam from said first control valve to said engine, and a second control valve of the thermostatic proportioning type in flow relation in said connector conduit means and said bypassing conduit means for mixing steam passing through said heat exchanging and muffling means and steam passing through said bypass conduit means in predetermined proportions for delivery to said engine.

2. A power recouping system for recouping and applying heat energy otherwise lost in the exhaust gases from an internal combustion engine, said system including an exhaust conduit for said gases, an accumulator having fluid contained therein, said fluid being controllably heated by a portion of said gases, a fluid superheater heated by a second portion of said gases, conduit means having a reducing valve therein and connecting said accumulator and said superheater, conduit means for bypassing a portion of said fluid around said superheater, thermostatic valve means for controlling and mixing said superheated and said by-passed fluid, and conduit means for introducing said fluid mixture into the combustion chambers of said engine to utilize the heat energy therein for additional power other than power developed in said chambers by combustion of fuel therein.

References Cited in the file of this patent
UNITED STATES PATENTS

| 594,185 | Thomas | Nov. 23, 1897 |
| 933,577 | Penniman | Sept. 7, 1909 |
| 992,780 | Kitchen | May 23, 1911 |
| 1,068,414 | Courtenay | July 29, 1913 |
| 1,594,383 | Ruths et al. | Aug. 3, 1926 |
| 1,665,885 | Le Mesurier | Apr. 10, 1928 |
| 1,767,714 | Stender | June 24, 1930 |
| 2,245,209 | Mayo | June 10, 1941 |
| 2,429,035 | Steving | Oct. 14, 1947 |
| 2,708,827 | La Marche | May 24, 1955 |